United States Patent
Chiu et al.

(10) Patent No.: US 6,299,924 B1
(45) Date of Patent: *Oct. 9, 2001

(54) BULKING AGENTS AND PROCESSES FOR PREPARING THEM FROM FOOD GUMS

(75) Inventors: Chung-Wai Chiu, Westfield; Matthew J. Henley, Somerset; James P. Zallie, Hillsborough; Roger Jeffcoat, Bridgewater, all of NJ (US)

(73) Assignee: National Starch and Chemical Investment Holding Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/103,827

(22) Filed: Jun. 24, 1998

Related U.S. Application Data

(62) Division of application No. 08/597,777, filed on Feb. 7, 1996, now Pat. No. 5,811,148, which is a continuation of application No. 07/525,943, filed on May 17, 1990, now abandoned.

(51) Int. Cl.$^7$ .................................................. A23L 1/05
(52) U.S. Cl. ................... 426/573; 426/548; 426/574; 426/575; 426/576; 426/577; 426/658
(58) Field of Search ................... 426/548, 573, 426/574, 575, 576, 577, 658

(56) References Cited

U.S. PATENT DOCUMENTS

| | | | |
|---|---|---|---|
| 3,399,189 | 8/1968 | Gordon | 260/209 |
| 3,480,511 | 11/1969 | Jones | 195/31 |
| 3,766,165 | 10/1973 | Rennhard | 260/209 R |
| 3,901,874 | 8/1975 | Hill | 260/209.5 |
| 4,018,934 | * 4/1977 | Parliment | 426/540 |
| 4,024,290 | 5/1977 | Layton | 426/548 |
| 4,200,661 | 4/1980 | Brigand et al. | 426/573 |
| 4,376,198 | 3/1983 | Dwivedl et al. | 536/4.1 |
| 4,451,489 | 5/1984 | Beale et al. | 426/254 |
| 4,459,316 | 7/1984 | Bakal | 426/658 |
| 4,526,794 | 7/1985 | Altomare et al. | 426/258 |
| 4,626,441 | 12/1986 | Wolkstein | 426/548 |
| 4,668,519 | 5/1987 | Dartey et al. | 426/548 |
| 4,786,722 | 11/1988 | Zehner | 536/1.1 |
| 4,871,571 | 10/1989 | Jensen et al. | 426/548 |
| 4,971,814 | 11/1990 | Tomita et al. | 426/52 |
| 5,032,297 | 7/1991 | Williamson et al. | 252/8.551 |
| 5,073,387 | 12/1991 | Whistler | 426/7 |
| 5,188,858 | * 2/1993 | Stipp et al. | 426/601 |
| 5,811,148 | * 9/1998 | Chiu et al. | 426/548 |

FOREIGN PATENT DOCUMENTS

| | | |
|---|---|---|
| 0 251 798 A1 | 1/1988 | (EP) . |
| 0 301 440 A1 | 2/1989 | (EP) . |
| 0 404 227 A2 | 12/1990 | (EP) . |
| 0 449 594 A2 | 10/1991 | (EP) . |
| 210965/87 | 9/1987 | (JP) . |
| 2-248401 | 10/1990 | (JP) . |
| 89/04609 | 1/1989 | (WO) . |
| 89/02900 | 6/1989 | (WO) . |
| 90/02807 | 3/1990 | (WO) . |
| 91/11112 | 8/1991 | (WO) . |
| 93/15116 | 8/1993 | (WO) . |

OTHER PUBLICATIONS

Shia, S., & Chang, G.W., Effects of Dietary Fiber on Fecal Mucinase and Beta–Glucurondase Activity In Rats, *J. Nutrition*, vol. 113, No. 1, 1983, pp. 138–144.

Layton, R.M., et al., Glucosylsorbitol Adds Bulk Without Sweetness, Calories, *Food Product Development*, vol.. 12, No. 2, 1978, p. 53.

Salyers, A.A., Energy Sources of Major Intestinal Fermentative Anaaerobes, *Amer. J. Clin. Nutrition*, vol. 32, Jan. 1979, pp. 158–163.

Salyers, A.A., et al., Degradation of Polysaccharides by intestinal Bacterial Enzymes, *Amer. J. Clin. Nutrition*, vol. 31, Oct. 1978, pp. S128–S130.

(List continued on next page.)

*Primary Examiner*—Leslie Wong
(74) *Attorney, Agent, or Firm*—Karen G. Kaiser

(57) ABSTRACT

Soluble bulking agents for replacing up to 100% of the sucrose or other soluble, simple carbohydrates in edible formulations are provided. The bulking agents are substantially non-digestible and have an average molecular weight range of 500 to 50,000. Also provided are edible formulations containing these bulking agents and processes for preparing these bulking agents, preferably by enzymatically depolymerizing naturally-occurring, heteropolysaccha-rides such as pectin, tamarind seed gum, guar gum, locust bean (carob seed) gum, konjac gum, xanthan gum, alginates, agar or other food gums to yield a mixture of heteropolysaccharide fragments having an average DP of 3 to 75, preferably 3 to 30. The process employs one or more enzymes such as 1,4-beta-D-Mannanmannohydrolyase, or 1,6-alpha-D-Galactosidase for degrading 1,4-beta-D-linked mannose-containing heteropolysaccharides (e.g., guar gum); or one or more enzymes such as 1,4-beta-D-Glucanase, 1,4-beta-D-Glucanglucanohydrolase, and 1,4-beta-D-Glucanglucohydrolase or 1,4-beta-D-glucan cellobiohydrolase for degrading 1,4-beta-D-linked glucose-containing heteropolysaccharides (e.g., tamarind seed gum).

11 Claims, No Drawings

OTHER PUBLICATIONS

Fat & Fiber, Practical implications for Calorie Reduced Products, Gernal Session—Wednesday, Feb. 14, 1990, Hidehisa Takahashi, "Dietary Fiber from Guar Plant Seed".

Beereboom, J.J., Low Calorie Bulking Agents, *Low Calorie and Special Dietary Foods,* Dwivedi, Basant,K., Ed., CRC Press, pp. 39–50, No date.

Tamarind Seed Polysaccharide: Glyloid: Thickening: Stabilizing and Gelling Agent, Technical Bulletin, Dalnippon Pharmaceutical Co., Inc. Osaka, Japan, no date.

Physiological Effects of Food Carbohydrates, American Chem. Society Symposium Series No. 15, Jeanes, A. and Hodge, J., Eds., ACS, Washington, D.C. 1975, pp. 267–347.

Takahashi, H., Dietary Fiber From Guar Plant Seed, Mar, 1990, Technical Bulletin, Talyo Kagaku Company, ltd., 20 pages.

Effective applications for Functional Ingredents in Food and Beverages, Technical Series, Sun Fiber (a product of the enzyme breakdown of guar gums) Mar. 1990, Confectionery tEchnical Center Inc.

N. Yamazaki and H.H. Dietrichs, newspaper "Effect of a Purified Endo–1,4–β–mannanase Upon Glactomannan from Guar", no date.

* cited by examiner

BULKING AGENTS AND PROCESSES FOR PREPARING THEM FROM FOOD GUMS

This is a divisional of Ser. No. 08/597,777, filed Feb. 7, 1996, now U.S. Pat. No. 5,811,148 which is a continuation of Ser. No. 07/525,943, filed May 17, 1990, now abandoned.

BACKGROUND OF THE INVENTION

This invention relates to bulking agents for use in edible formulations and processes for preparing these agents from food gums, such as pectin, carrageenan, alginates, tamarind seed gum, xanthan gum, konjac gum, guar gum, and locust bean (or carob seed) gum. Bulking agents can be used to partially or completely replace high-caloric ingredients, such as sugar and/or flour so as to prepare an edible formulation with a reduction in calories. Also, the bulking agents are useful as a source of soluble fiber to be incorporated into foods and, unlike sucrose, are non-cariogenic.

When the sugar component of an edible formulation is replaced by a low calorie sweetener, such as saccharin, cyclamate or aspartame, the bulking and other textural benefits of the sugar component are lost. Bulking agents are required in these formulations to simulate the functional properties of sugar. These functional properties include body, viscosity and mouthfeel in liquids, volume, cell structure, crumb structure and humectancy in baked goods and overall visual and textural impact in a variety of edible formulations. Sugar also functions to depress the freezing point and increase the boiling point of various foods. In baked goods, which typically contain 15–40% sugar, the bulking agent used to replace the sugar must provide significant functional qualities other than sweetness which the sugar contributes to the baked goods.

There is increasing interest in foods having a reduced caloric content, and especially in low-calorie, baked goods. Such baked goods are desirable for reducing body weight and preventing unwanted weight gain. One approach to reducing the caloric value of baked goods has been to replace part of the carbohydrate components (e.g., sugar or flour) with agents that are substantially non-digestible, and hence low in calories.

For example, various forms of purified plant cellulose, such as alpha-cellulose sold under the trade name "Solka-Floc," and microcrystalline cellulose sold under the trade name "Avicel," have been proposed as partial flour substitutes. When these conventional cellulose materials are used as bulking agents in a food, the food is not smooth, has a gritty mouthfeel, gives the impression of the presence of an additional insoluble or residual substance and tends to accumulate in the mouth. The soluble cellulose derivatives which have been used as bulking agents tend to form unpalatable, gummy masses in the mouth.

Polydextrose, a soluble, substantially non-digestible carbohydrate, has been sold as a sugar substitute having bulking properties that are superior to those of cellulose materials. Polydextrose often imparts an undesirable bitter or sour flavor and undesirable texture to foods at high usage levels.

Typically, two types of bulking agents are used to replace carbohydrates in reduced caloric foods. Soluble bulking agents are used to replace sucrose and simple sugars, and insoluble bulking agents are used to replace flour or starch. The bulking agents herein are of the first type.

This invention provides substantially non-digestible bulking agents for use in low- or reduced-calorie foods and other edible formulations, which agents provide the functional benefits of sugar. These agents are soluble, depolymerized heteropolysaccharide fragments which are prepared by depolymerization of naturally-occurring food gums (e.g., konjac gum, guar gum, locust bean (carob seed) gum, and pectins, tamarind seed gum, xanthan gum, carrageenan and alginates) to an average DP (degree of polymerization) of about 3 to 75. Enzymatic depolymerization (to a molecular weight of about 500–5,000) is preferred. Up to 100% of the sucrose or other soluble simple carbohydrates may be replaced by these bulking agents. The bulking agents are typically used with high intensity, low-caloric sweeteners, such as saccharin, methyl L-aspartyl phenylalanine ("aspartame"), acesulfame-K, alitame, trichlorogalactosucrose, cyclamates, fructose and neohesperidine dihydrochalcone, which will provide the sweet taste of sugar while the bulking agents impart physical properties other than sweetness.

These bulking agents may be simply and economically produced without extensive purification from naturally-occurring heteropolysaccharides having histories of safe use in edible formulations (e.g., pectin and guar gum). They contribute little, if any, flavor or color to the formulation and are stable under typical food storage conditions.

An enzymatically digested guar gum (24,000–30,000 molecular weight) has been suggested for use in foods as a dietary fiber associated with several beneficial physiological effects. See, Hidehisa Takahashi, "Dietary Fiber from Guar Plant Seed," Bulletin of Taiyo Kagaku Company, Ltd., March, 1990. Depolymerized carrageenan (20,000 molecular weight) has been used for peptic ulcer treatment. *Physiological Effects of Food Carbohydrates,* Amer. Chem. Society Symposium Series No. 15, Jeanes, A. and Hodge, J., Eds. ACS, Washington, D.C. 1975, pp. 282–295. The use of depolymerized gums as a functional substitute for sugar in foods is not disclosed.

SUMMARY OF THE INVENTION

This invention provides soluble bulking agents for use in edible formulations, comprising substantially depolymerized heteropolysaccharide(s) having an average DP of 3 to 75, which heteropolysaccharide(s) are naturally-occurring and have hexose backbone(s). The bulking agents preferably comprise at least 90%, by weight, of depolymerized heteropolysaccharide(s) having a molecular weight of less than 10,000. They preferably are enzymatically depolymerized; have an average DP of 3 to 30; have a weight average molecular weight from about 500 to 5,000; and a dextrose equivalent of at least 20. The bulking agents may replace up to 100% of the sucrose or other soluble simple carbohydrates in edible formulations.

The bulking agents may be derived from a variety of food gums, such as guar gum, locust bean gum, tamarind seed gum, alginates, agar, xanthan gum, carrageenan, konjac gum and pectin, or a combination thereof, by enzymatic, chemical, thermal or mechanical depolymerization process(es), or by a combination of processes. Bulking agents derived from guar gum, locust bean gum and tamarind seed gum are preferred.

This invention also provides processes for preparing the bulking agents from food gums, comprising the steps:

(a) preparing an aqueous dispersion comprising one or more food gum(s);

(b) bringing the dispersion into contact with an effective amount of one or more enzyme(s) capable of cleaving the gum(s) to yield a mixture of heteropolysaccharide fragments; and (C) permitting the enzyme(s) to depolymerize the gum(s) to an average DP of 3 to 75 at a pH of 3 to 7 and a temperature of 10 to 70° C.

Optionally, the process may comprise the further steps of deactivating the enzyme(s); recovering the bulking agents; refining the bulking agents; or granulating or drying the bulking agents; or a combination thereof. In a preferred process, galactomannan gum(s) are depolymerized with a mannanase, a galactosidase or a combination thereof. In another embodiment, tamarind seed gum or xanthan gum is depolymerized with one or more cellulase(s) or glucohydrolases.

This invention also provides edible formulations, comprising substantially non-digestible depolymerized heteropolysaccharide(s), having an average molecular weight of 500 to 50,000, as bulking agents. These bulking agents are derived from food gum(s) having hexose backbone(s).

Among the edible formulations which may include the bulking agents are: baked goods; puddings, creams and custards; jams and jellies; confections; soft drinks and other sweetened beverages, in liquid or dry form; sauces and salad dressings; ice cream and frozen desserts; foods which are sweetened; tabletop sweeteners and pharmaceuticals.

In particular, sweetened edible formulations containing a sweetener with fewer calories than sucrose may be prepared from a soluble, depolymerized heteropolysaccharide bulking agent(s) having an average DP of 3 to 75. These sweetened, edible formulations also may comprise acesulfame-K, alitame, trichlorogalactosucrose, cyclamates, saccharin, aspartame or its salts or metal complexes, or mixtures thereof, in amounts effective to render the formulation sweet.

DESCRIPTION OF THE PREFERRED EMBODIMENTS

The bulking agents are heteropolysaccharides which have been depolymerized to a DP of 3 to 75, preferably a DP of 3 to 30. The bulking agents preferred for use in this invention include any depolymerized water soluble heteropolysaccharides which are substantially non-digestible by humans. The bulking agents are derived from natural sources (preferably gums approved for use in foods); provide fewer calories than sucrose (preferably provide essentially no calories); and provide the functional benefits of sugar (preferably those of sucrose), other than sweetness, in edible formulations.

The bulking agents preferably comprise monosaccharides other than glucose, but may include glucose linked to diverse monosaccharides by glycosyl bonds which resist attack by human digestive enzymes (e.g., beta-1,4-; beta-1, 3-; and beta-1,6-bonds). Representative monosaccharide components of bulking agents are shown in Table I. The agents preferably comprise mannose, galactose, xylose, glucose and sugar acids, such as galacturonic acid, and derivatives thereof.

TABLE I

Bulking Agents

| Gum Source | Monosaccharides | Representative Structure of Heteropolysaccharide Fragments[a] | Molecular Weight |
|---|---|---|---|
| Guar Gum | mannose:galactose 3:2 | A-D-Gal  -D-Gal<br>(1,6)-A → \|     \| ← (1,6)-A<br>-B-D-Man-Man-Man-Man- | 300,000 |
| Locust Bean Gum (carob) | mannose:galactose 4:1 | -D-Gal<br>(1,6)-A → \|<br>-B-D-Man-Man-Man-M- | 300,000 |
| Konjac Gum | mannose:glucose 1.6:1 (sequences have at least 3 consecutive mannoses) | -B-D-Man-Man-Man-Man-Glu- | 1,000,000 |
| Xanthan Gum | glucose:mannose: glucuronic acid | B-D-Glu-Glu-Glu-<br>\| ← (1,3)-A<br>Man-OAC<br>\| ← (1,2)-A<br>Glu-COOH<br>\| ← (1,4)-A<br>Man-OAC (Pyruvate) | 5,000,000– 10,000,000 |
| Tamarind Seed Gum | glucose:xylose: galactose | (1,2)-B → Gal<br>\|<br>(1,6)-B → Xyl Xyl Xyl<br>\|  \|  \|<br>-B-D-Glu-Glu-Glu-Glu-Glu- | 650,000 |
| Pectin | galacturonic acid (methyloxylated or acetate esters) | COOME<br>\|<br>A-D-Gal-Gal-Gal-<br>\|<br>COOME | 120,000 |

TABLE I-continued

Bulking Agents

| Gum Source | Monosaccharides | Representative Structure of Heteropolysaccharide Fragments[a] | Molecular Weight |
|---|---|---|---|
| Alginates | D-mannuronic acid; L-glucuronic acid | COOME    COOH<br>\|         \|<br>B-D-Man-L-Gul-D-Man-<br>\|<br>COOH | 200,000 |
| Carrageenan | galactose-sulfate; 3,6-anhydro-D-galactose | $SO_3$*<br>\| \|<br>B-(1,3)-D-Gal-Gal-B-(1,4)- | 250,000 |

[a]Except where indicated, all linkages are 1,4-beta-D-. AC = acetate; ME = Methyl; Gul-COOH = Glucuronic acid; Glu-COOH = guluronic acid; Man-COOME = mannuronate ester;
* = 3,6-anhydro-; A = alpha; and B = beta.

As used herein, non-digestible, means human digestive enzymes are incapable of depolymerizing the bulking agents to yield monosaccharides with nutritive value to humans. Human amylolytic enzymes, such as 1,4-alpha-D-Glucan glucanohydrolase; 1,4-alpha-D-Glucan maltohydrolase; and 1,4-alpha-D-Glucan glucohydrolase; maltosidases, glucosidases, sucrase and phosphorylase, are incapable of depolymerizing the heteropolysaccharide bulking agents herein. Likewise the brush border enzymes of the human intestine, such as maltase, isomaltase (alpha-dextrinase), lactase, trehalase, glycosylceramidase and alkaline phosphatase are incapable of degrading the bulking agents and the heteropolysaccharide components of dietary fiber from which the bulking agents are derived.

Among the dietary polysaccharides, only cooked starch, amylodextrins, and glycogen are considered to be fully digestible. The other, largely indigestible food polysaccharides of vegetable origin are included in the group of substances called "dietary fiber." Dietary fiber is not to be confused with "crude fiber." Only a fraction of dietary fiber is fibrous, and some of it (the fraction employed herein) is soluble in water. Dietary fiber consists of amorphous as well as fibrous cellulose, along with the associated hemicelluloses, protopectin, soluble pentosans, and soluble fructans. Noncarbohydrate lignin is another component of dietary fiber. Lignin and cellulose are the main constituents of the "crude fiber" fraction of proximate analysis (i.e., the residue remaining after hot acidic and alkaline extractions of defatted foods). The natural, heterogeneously constituted and essentially indigestible food-additive gums, and the bulking agents prepared by depolymerizing these gums, also are considered to be dietary fiber because their various polysaccharide structures resemble those of the hemicelluloses and pentosans of foods.

While data on human digestibility of these heteropolysaccharides is scarce, any observed digestibility is apparently the result of microbial fermentation in the large intestine (see, e.g., *Physiological Effects of Food Carbohydrates*, Jeanes & Hodge, Editors, 1975, ACS Symposium Series, Wash., D.C., pp. 267–347). To the extent that microbial fermentation of these heteropolysaccharides occurs in absorptive regions of the human gut (i.e., primarily the small intestine) the monosaccharides produced thereby could contribute nutritive content to the heteropolysaccharides.

Microbial fermentation of dietary fiber occurs largely in the lower intestine and produces fatty acids having very limited nutritive value to humans, relative to that of sugars. Feeding studies with rats have shown that diets containing 5 or 15% of guar gum, pectin, carrageenan or cellulose either reduced the weight gain, or caused an increase in diet consumed to maintain an equivalent weight gain to that of a fiber free diet control. Shiau, S., and Chang, G. W., Effects of Dietary Fiber on Fecal Mucinase and Beta-Glucuronidase Activity in Rats, *J. Nutrition* Vol. 113, No. 1, 1983, pp. 138–144.

Thus, these heteropolysaccharides, together-with their depolymerized heteropolysaccharide counterparts used as bulking agents herein, are considered to be a substantially non-caloric soluble dietary fiber component of foods. When used to replace sucrose in foods, the foods containing the bulking agents have fewer calories than equivalent sucrose-containing foods.

Because the bulking agents disclosed herein are used in edible formulations, their safety is critical. Thus, the bulking agents are isolated from or derived from natural sources, and in particular, from heteropolysaccharides which have historically been used in edible formulations without adverse effects.

Suitable heteropolysaccharides include substantially non-digestible, plant and microbial gums and soluble fibers which are substantially water-soluble or -dispersible, are substantially non-cellulosic, and are susceptible to depolymerization to yield the heteropolysaccharide fragments employed herein as bulking agents. Food gums with proven safety as food or pharmaceutical additives are preferred.

Suitable heteropolysaccharides include, but are not limited to: guar, locust bean gum, konjac gum, xanthan gum, tamarind seed gum, alginates, carageenan, agar and pectins. Also suitable are those naturally-occurring heteropolysaccharides comprising one or more of the representative structural fragments depicted in Table 1. With the exception of heteropolysaccharides comprising significant amounts of starch (1,4-alpha-D-glucopyranoses), dextran (1,6-alpha-D-glucopyranoses), glucans (1,3-beta-D-glucopyranoses) and cellulose (1,4-beta-D-glucopyranoses), nearly all naturally-occurring heteropolysaccharides are capable of yielding non-digestible bulking agents upon depolymerization.

Any process known in the art may be employed to depolymerize the naturally-occurring heteropolysaccharide. The practitioner will select processes, or combinations of processes, which tend to yield heteropolysaccharide fragments, rather than monosaccharides, so as to provide a low calorie bulking agent. The only requirements are that the process provide heteropolysaccharides having an average DP of 3–75, that are substantially non-digestible and suitable for use in foods as a functional replacement for sugar. Thus, the depolymerization or degradation process may be carried out by treatment with enzyme(s), or acid or oxidation or other chemical means, or by thermal means, or by mechanical shear or by a combination thereof. Enzyme treatment is preferred. The depolymerization process may be employed alone or in combination with other process(es).

Endo-enzymes are preferred for enzymatic depolymerization because they typically produce fewer monosaccharides than exo-enzymes. Blends of both enzyme types may be employed, however, particularly when caloric content is not critical or when monosaccharide products are not digestible. The selection of an appropriate enzyme(s) will be guided by the nature of the starting material. For example, galactomannan gums may be hydrolyzed with an 1,4-beta-D-Mannanmannohydrolase, an 1,6-alpha-D-Galactoside galactohydrolase, or a combination thereof. Suitable mannanases include beta-D-Mannoside mannohydrolase (E.C. 3.2.1.25), 1,4-beta-D-Mannanmannanohydrolase (E.C. 3.2.1.78); alpha-D-Galactoside galactohydrolase (E.C. 3.2.1.22); and alpha-D-Mannoside mannohydrolase (E.C. 3.2.1.24).

Galactomannan gums are frequently found in the seed endosperm of leguminous plants. They comprise an essentially linear beta-mannan backbone and single unit alpha-galactopyranose branches. Among the galactomannan gums which have been used in foods are guar gum and locust bean (or carob seed) gum. Guar and locust bean gums contain a beta-1,4-D-linked backbone of mannose with 3:2 and 4:1, respectively mannose:galactose, with alpha-1,6-D-branches linking galactose to the mannose backbone.

Closely related to these gums is konjac gum, a glucomannan gum. Konjac gum comprises a mannose:glucose backbone in a ratio of about 1.6:1, wherein mannose units occur in groups of at least three. Like guar and locust bean gums, konjac gum may be depolymerized by treatment with a 1,4-beta-D-Mannan mannohydrolase.

In a preferred embodiment, a 1,4-beta-D-Mannan mannohydrolase (e.g., Gamanase™, obtained from Novo Industries, Inc., Danbury, Conn., and derived from submerged fermentation of Aspergillus niger) is incubated with dispersion of a galactomannan or a glucomannan gum at a temperature from 25 to 90° C., preferably 60 to 85° C., and a pH from 2.5 to 10.0, preferably 3.0 to 6.3, to depolymerize the gum. Dispersions containing from 20 to 40%, by weight, gum are preferred. For an enzyme preparation having an activity of 1,500,000 VHCU/g (Viscosity Hemicellulase Units/gram : a Novo Industries, Inc. unit which reflects the reduction of viscosity of a locust bean substrate at pH 5 and 30° C. after 60 minutes), about 50 to 200 ml of enzyme preparation is required to depolymerize 1 Kg of guar gum to a DP of 3-30 over a period of 5 days at 65–70° C. For 1 Kg of locust bean gum, 25 ml of enzyme will depolymerize the locust bean gum to a DP of 3-30 in 5 hours. The progress of the depolymerization reaction may be monitored by change in viscosity, reducing sugar content, or molecular weight.

It may be desirable to pre-treat the guar gum with one or more galactohydrolase(s) before the mannanase treatment. This pretreatment removes galactose branches, enabling the mannanase to more readily depolymerize the mannose backbone of the guar gum and permitting depolymerization of gum to a DP of 3–30. With this pre-treatment, the reaction efficiency of the guar gum depolymerization will approach that of the locust bean gum. The galactase and mannanase treatments also may be carried out simultaneously.

The practitioner will recognize that enzyme preparations from other sources may have different activities and different requirements for temperature, pH and other conditions, and will modify the depolymerization process accordingly.

In an alternate preferred embodiment, the gum may be depolymerized by acid hydrolysis. The acid treatment is preferably carried out on a guar gum dispersion containing 20 to 40%, by weight, gum, with an acid approved for use in or contact with foods (e.g., sulfuric acid, hydrochloric acid or phosphoric acid) at an acid concentration and temperature effective to yield an average DP of 3–75. For example, 500 ml of a 2% solution of sulfuric acid will depolymerize 10 grams of guar gum to a DP of 3–75 at 60° C. in 6 hours.

The tamarind seed gum may be depolymerized with cellulase(s), such as 1,4-beta-D-Glucan glucanohydrolase, or a 1,4-beta-D-Glucan glucohydrolase, or a combination thereof. Suitable cellulases include 1,4-beta-D-Glucan cellobiohydrolase (E.C. 3.2.1.91); 1,4-beta-D-Glucan glucohydrolase (E.C. 3.2.1.74); 1,4-(1,3;1,4)-beta-D-Glucan 4-glucanohydrolase (E.C. 3.2.1.4); 1,3-(1,3;1,4)-beta-D-Glucan 3(4)-glucanohydrolase (E.C. 3.2.1.6); and beta-D-Glucoside glucohydrolase (E.C. 3.2.1.21). Tamarind seed gum comprises a 1,4-beta-D-glucan backbone substituted with single unit 1,6-alpha-D-xylopyranosyl, and 1,6-alpha-D-xylopyranosyl-1,2-beta-D-galactopyranosyl branches. Tamarind seed gum comprises galactose:xylose:glucose at a ratio of about 1:2:3. The gum may be selected from refined or crude starting materials. For example, a de-oiled tamarind seed powder remaining after solvent extraction of the ground seed kernel may be employed. Also useful is the refined heteropolysaccharide obtained by removing protein and other seed components in addition to the oil.

In a preferred embodiment, a dispersion of the tamarind seed gum is digested with an enzyme preparation comprising cellobiohydrolase (E.C. 3.2.1.91), 1,4-beta-D-glucosidase (E.C. 3.2.1.74) and 1,4-beta-D-glucanase (E.C. 3.2.1.4) (Celluclaste, obtained from Novo Industries, Inc., Danbury, Conn.) at a pH from 3.0 to 7.0, preferably from 4.5 to 6.0, and a temperature from 25 to 75° C., preferably 55 to 65 C, to depolymerize the gum. Dispersions containing from 20 to 40%, by weight, gum are preferred.

For an enzyme preparation having an activity of 1500 NCU/g (One Novo Cellulase Unit (NCU) is the amount of enzyme which, at pH=4.8 and 40° C., degrades carboxymethyl-cellulose to reducing carbohydrates with a reducing power of 1 umol glucose/minute), about 30 to 100 ml of enzyme preparation is required to depolymerize 1 kg of gum over a period of about one day at 50–55° C. The progress of the depolymerization reaction may be monitored by changes in viscosity, reducing sugar content or molecular weight. The practitioner will recognize that processing conditions may be readily modified to accommodate different enzyme preparations, gum sources and end product attributes.

To depolymerize xanthan gum, a cellulase is preferred. Xanthan gum is derived from a bacterial source and comprises D-glucose, D-mannose and D-glucuronic acid in the ratio of about 3:3:2, with acetyl and pyruvic acid substituent groups present on various saccharide units.

To depolymerize pectin, a pectinase, such as Breakeraset G (Gist-Brocades, USA, Inc., Charlotte, N.C.) is preferred. Suitable pectinases include Poly(1,4-alpha-D-galacturonide)glycanohydrolase (E.C. 3.2.1.15); Poly(1,4-aha-D-galacturonide)glycanohydrolase (E.C. 3.2.1.67); Poly(1,4-alpha-D-galactosiduronate)

digalacturonohydrolase (E.C. 3.2.1.82); Poly(1,4-alpha-D-galactosiduronate)lyase; Poly(1,4-alpha-D-galactosiduronate)exolyase; and Poly(methyl-D-galactosiduronate)lyase. Pectin is a component of plant cell walls comprising 1,4-alpha-D-galacturonic acid, with or without methoxylated carboxylic acid moieties and acetic ester moieties at $c_2$ and $c_3$.

Alginates are gums derived from seaweed which occur in a variety of structures. The alginates include linear heteropolysaccharides comprising D-mannuronic acid and L-guluronic acid in varying ratios. Other seaweed extracts include beta-D- and alpha-L-galactans, which may be substituted with sulfate half-ester groups and linked to 3,6-anhydro-alpha-L-(or beta-D-) galactose branches by a 1,3-linkage.

Other gums useful as starting materials in the production of the bulking agents herein include agar, carrageenan gum, ghatti, karaya (Sterculia) and York tragacanth. Other enzymes useful herein include K-carrageenan 4-beta-D-glycanohydrolase (E.C. 3.2.1.83); and Agarose 3-glycanohydrolase (E.C. 3.2.1.81) for carrageenan gum and agar respectively.

As with guar gum and tamarind seed gum, the practitioner will recognize that enzymes (or other depolymerization agents) and processing parameters may be readily selected to suit the particular heteropolysaccharide and the bulking agent to be prepared therefrom. Mixtures of gums may be depolymerized to yield a blend of bulking agents. The only process limitations are that the product must comprise heteropolysaccharide fragments with an average DP of 3 to 75, preferably 3 to 30, and exhibit the functional characteristics, other than sweetness, of sugars, particularly sucrose, in edible formulations. Not more than 10% of the bulking agent should have a molecular weight which exceeds 10,000 (weight average molecular weight). The preferred molecular weight is from 500 to 5,000, however, particular ranges may be preferred for different food applications.

For example, cakes require a lower average molecular weight (500–2,500) bulking agent. A higher average molecular weight (2,500–13,000) is suitable for heavier-textured foods such as pudding and ice cream. Other foods, such as table top sweeteners used in place of sucrose, may contain bulking agents having molecular weights up to 50,000, provided the sweetener does not excessively increase the viscosity of the food sweetened thereby. Additionally, for preferred functional characteristics, the DE of the bulking agents should be at least 20 and the viscosity of a 30% solution should not exceed 50 cps. The DE, or dextrose equivalent, is a measurement of the reducing sugar content of degraded polysaccharides. The more degradation, the higher the DE and the percent reducing sugars.

Following depolymerization, the heteropolysaccharide product is typically a mixture of saccharide fragments, the majority of which have a DP of 3 to 30. This product mixture may be refined by washing, filtration, adsorption, distillation, chromatography or any method known in the art (e.g., carbon or activated clay filtration, vacuum filtration, ion exchange chromatography, steam stripping, centrifugation, ultrafiltration, column chromatography, reverse osmosis, or other methods of fractionation) to yield a purified bulking agent. The product may be used, as is, in a dispersed state. It may be dried by any means known in the art, with or without purification steps and the enzyme may be deactivated (e.g., by treatment with extremes of temperature and pH) to prevent excessive depolymerization of certain gums (e.g., locust bean gum). The denaturation may be carried out while drying or purifying the bulking agent or by a separate step. The depolymerization process may be combined with other process(es), such as gum isolation or pre-refinement, or formulation with additional edible components (e.g., saccharin) prior to, during, or after drying, granulation or other processing steps in the manufacture of the bulking agents.

The bulking agents herein may be employed alone, or as mixtures, in any edible formulation. The nature of the edible formulation will direct the selection of an appropriate bulking agent from those disclosed herein. In a preferred embodiment, the edible formulation contains the bulking agent(s) in place of sucrose, or other granulated sugar, or corn syrup, high fructose corn syrup, or other sweeteners. The edible formulation may be liquid or dry, may be heat processed or frozen or refrigerated, and may contain appropriate high potency sweeteners. The bulking agents are stable to the temperature, oxygen content, enzymatic activity and pH conditions normally observed in the manufacture and storage of foods, pharmaceuticals and other edible formulations.

In a preferred embodiment, the edible formulation is a baked food. In a second preferred embodiment, the edible formulation is a low calorie sweetener, comprising the bulking agent(s) and a high potency (artificial) sweetener selected, for example, from aspartame, acesulfame-K, saccharin, cyclamates and the like. The low calorie sweetener blend may be used alone, as a table-top sweetener, or in edible formulations to replace sugars. It may be in a liquid, powdered or a granulated form.

In the examples which follow, all parts and percentages are by weight and molecular weights are estimated from gel permeation chromatography (GPC) employing dextran standards.

EXAMPLE 1

This example illustrates the preparation of bulking agents from a commercially available refined tamarind seed gum.

Sodium benzoate (0.3 g) was dissolved in 1.2 L water, the pH was adjusted to 5.0–5.2 with a 3:1 solution of water:HCl, and the solution was placed in a 50° C. water bath. When the solution reached 50° C., 8.3 ml of Celluclasts enzyme preparation (Novo Industries, Inc., Danbury, Conn.) was added to the solution. A total of 300 g tamarind seed gum (Glyloid® 3S, obtained from Dainippon Pharmaceuticals, Inc. Osaka, Japan) was slowly added to the enzyme solution and enzymatic depolymerization was carried out for 20 hours at 50° C.

The enzyme was deactivated by the addition of sufficient 3:1 solution of water:HCl to lower the pH to 2.7–3.0 for ½ hour. The solution was then neutralized by the addition of 3% NaOH and spray-dried on an Anhydro Spray-Drier (Type-Lab. S1, Anhydro Corp., Copenhagen, Denmark) at 15% solids with an inlet temperature of 210–215° C. and an outlet temperature of 90° C. Air at 30 p.s.i. was used to atomize the solution in the drier.

The molecular weight was determined by gel permeation chromatography employing dextran standards. The estimated peak molecular weight of the product (86% of total mixture) ranged from about 650 to 2,400 . The molecular weight fraction above 10,000 represented 1.6% of the total product. The molecular weight fraction below 300 represented about 10% of the total product. The product contained 24% reducing sugars. The viscosity of a 50% solution measured on a Brookfield viscometer (20 rpms, 2 spindle) was 150 cps.

EXAMPLE 2

This example illustrates the preparation of bulking agents from a crude, de-oiled, tamarind kernel powder.

Sodium benzoate (2.0g) was dissolved in 8 L of water, the solution pH and temperature were adjusted as in Example 1, and 200 ml of Celluclast® enzyme preparation were added. A total of 2.0 Kg of de-oiled tamarind kernel powder (TIC Gums, Inc., Belcamp, Md.) was slowly added to the enzyme solution and enzymatic depolymerization was carried out for 24 hours at 50° C.

The enzyme was deactivated by increasing the temperature of the solution to 90° C. for ½ hour. A filter-aid (Celite 560, Manville, Inc., Lompoc, Calif.) (500g) was added to the hot solution and the solution was filtered through a Buchner funnel that had been pre-coated with Celite 560.

The filtrate containing the bulking agent was spray-dried as in Example 1, except that the filtrate was adjusted to 10% solids before drying. A total of 87% of the product had an estimated peak molecular weight of about 650 to 2,500, and 2% had an estimated molecular weight over 10,000.

EXAMPLE 3

This example illustrates the preparation of bulking agents from guar gum by enzymatic depolymerization.

Sodium benzoate (2.0g) was dissolved in 8.0 L of water, the pH was adjusted to 4.2–5.0 with a 3:1 HCl solution, 300 ml of Gamanase™ (Novo Industries, Inc., Danbury, Conn.) which had been ultrafiltered through a 30,000 molecular weight cut-off filter was added, and the enzyme solution was heated to 70° C. over a constant temperature water bath. A total of 2 Kg of guar gum (Dycole HV-400F, National Starch and Chemical Co., Bridgewater, N.J.) was slowly dispersed in the enzyme solution, the solution was covered and enzymatic depolymerization was carried out for 124 hours. One Kg samples of the solution were removed after 5 and 124 hours.

The enzyme preparation was deactivated by heating the samples to 90 C for ½ hour.

The 1.0 Kg samples were each filtered as in Example 2, except that 250 g of Celite 560 was used per 1.0 Kg sample. The filtrate containing the bulking agent was spray-dried as in Example 1, except that solids ranged from 10 to 15% and the inlet temperature was 220° C.

The estimated peak molecular weight ranged from about 220 to 4,600 (84% of total product) after 5 hours and from 250 to 1,750 (81% of total product) after 124 hours. The molecular weight below 300 represented 16.3% of the total 124 hour sample and 10% of the 5 hour sample. The bulking agent contained 20% reducing sugars after 5 hours and 33% after 124 hours. The viscosity of a 30% solution measured on a Brookfield viscometer (20 rpms; 2 spindle) was 50 cps after 5 hours and 20 cps after 124 hours.

EXAMPLE 4

This example illustrates the preparation of bulking agents from guar gum by acid hydrolysis.

A total of 500 ml of a solution of 2% $H_2SO_4$ was placed in a constant temperature water bath at 60° C. Guar gum (10 g of Dycol HV400F) was slowly dispersed in the acid solution and the reaction vessel was covered. Samples (100 ml) were withdrawn at 2, 3.5, 6 and 24 hours, and neutralized to pH of 5–6 by adding 25% NaOH. The samples were freeze-dried (Dura-Dry™ MP, Model # TD-3C-MP, FTS Systems, Inc., Stove Ridge, N.Y.).

The molecular weights of the samples were determined by the method of Example 1. The 2 and 3.5 hour samples were insufficiently depolymerized. Results for the 6 and 24 hour samples are shown in Table II.

TABLE II

Molecular Weight of Acid-Hydrolyzed Guar Gum

| | Peak Molecular Weight Fraction | % of Total |
|---|---|---|
| 6 hours | 0–300 | 17 |
| | 480 | 2 |
| | 6,300 | 57 |
| | 7,500 | 24 |
| 24 hours | 0–300 | 57 |
| | 480 | 11 |
| | 660 | 32 |

EXAMPLE 5

This example illustrates the preparation of bulking agents from konjac gum by enzymatic depolymerization.

A total of 0.2 g sodium benzoate was dissolved in 200 ml of deionized water and the pH was adjusted to 5.0–5.2. Celluclast enzyme (1 ml) and 16 g of Nutricol® konjac flour R80V (FMC Corp., Philadelphia, Pa.) were added slowly with agitation. The mixture was covered and depolymerization continued for 24 hours at 25° C. The reaction was terminated by holding the mixture at 95° C. for 30 minutes. The bulking agent was recovered by freeze-drying. Molecular weight was determined by the method of Example 1.

The konjac flour-derived bulking agent had the following composition:

| Peak Molecular Weight Fraction | % of Total |
|---|---|
| 957 | 19.8 |
| 770 | 16.5 |
| 523 | 20.9 |
| 0–500 | 42.8 |

EXAMPLE 6

This example illustrates the preparation of bulking agents from locust bean gum by enzymatic depolymerization.

Sodium benzoate (0.5 g) was dissolved in 2.0 L of water, 25.0 ml of Gamanase enzyme preparation was added, the pH was adjusted to 4.0–4.2 with a 3:1 HCl solution and the enzyme solution was heated to 70° C. over a constant temperature water bath. A total of 0.5 Kg of locust bean gum (Dycol® F-175, National Starch and Chemical Co., Bridgewater, N.J.) was slowly dispersed in the enzyme solution, the solution was covered and enzymatic depolymerization was carried out for 3.0 hours at 70° C.

The enzyme preparation was deactivated by the addition of sufficient 3:1 HCl solution to lower the pH to 2.7–3.0 for ½ hour. Afterwards, the solution was neutralized as in Example 1. The dispersion was filtered as in Example 2 (except that 50g of Celite 560 was added to the dispersion). The filtrate containing the bulking agent was spray-dried as in Example 1, except that the filtrate contained 18% solids.

The estimated peak molecular weight of the bulking agent ranged from 280 to 2,300 (93% of total product). The fraction having a molecular weight less than 300 represented 35% of the total product. The bulking agent contained 35% reducing sugars. The viscosity of a 30% solution measured on a Brookfield viscometer (20 rpms, 2 spindle) was 20 cps.

EXAMPLE 7

This example illustrates the preparation of bulking agents from pectin.

Deionized water (2.5 L) was heated to 50° C. over a constant temperature water bath, the pH was adjusted to 5.5 with a 3:1 solution of water:HCl, and 15 ml of Breakerase® (Gist-Brocades, USA, Inc., Charlotte, N.C.) was added to the water. A total of 500 g of citrus fruit pectin (Sigma Chemical Co., St. Louis, Mo.) was dispersed in the enzyme mixture and enzymatic depolymerization was permitted to continue for 4 days. The enzyme was deactivated by the addition of sufficient HCl to lower the pH to less than 3.0 for ½ hour. The product was spray-dried as in Example 1.

The pectin-derived bulking agent (72%) had an average peak molecular weight of 4,400. The fraction over 10,000 molecular weight was 1.5% of the total product; and under 300 was 16% of the total product. The viscosity of a 20%, by weight, solution was 50 cps (Brookfield viscometer; 20 rpm; 2 spindle).

EXAMPLE 8

This example illustrates the preparation of bulking agents from xanthan gum by enzymatic depolymerization.

Celluclast enzyme (1 ml) and 2.8 g xanthan gum (Kelco, Inc., Chicago, Ill.) were added to 200 ml water with agitation. The mixture was covered and depolymerization was carried out at room temperature for 24 hours, followed by heating to 90° C. for ½ hour. A 1.4% solution of the depolymerized xanthan gum had a viscosity of 1800 cps (20 rpms; 4 spindle). About 3.4% of the total depolymerized gum had an average peak molecular weight of 930 (DP =6).

EXAMPLE 9

This example illustrates the granulation of the bulking agents.

A total of 1.0 L of a 20% solid solution of the tamarind seed derived bulking agent of Example 1 was placed into a Brinkman Instruments RotoVapor (Buchi 011, Sybron Corp., Westbury, N.Y.) and heated to 86° C. The solution was evaporated under vacuum to at least 75% solids. The resulting syrup was spread on a Teflon® coated plate and air-dried at ambient conditions. The dried, polycrystalline bulking agent was ground and collected in granular form.

EXAMPLE 10

This example illustrates the use of the bulking agents of this invention to replace 100% of the sucrose in table top sweeteners.

A solution was prepared of 50 g of bulking agent derived from guar gum (depolymerized as in Example 1 to a DE of 24) and 0.2 g saccharin in 50 ml deionized water. The solution was heated to dissolve the bulking agent, spread on a Teflon® coated plate and dried at 50° C. in a draft oven overnight. The dried sweetener was ground and classified with U.S. standard sieves. The sweetener was collected as granules which passed through 40 mesh screen and were retained on 80 mesh screens.

This sweetener and a sucrose control were evaluated for solubility and viscosity in water at room temperature (1 g sweetener/15 ml water). The experimental sweetener functioned in a manner equivalent to the sucrose control.

EXAMPLE 11

This example illustrates the use of a bulking agent of this invention to replace 100% of the sucrose in baked goods.

Muffins were prepared according to the following formulation, employing either depolymerized tamarind gum (Example 1) or sucrose (control).

| | Muffin Formulation | |
|---|---|---|
| | Weight (grams) | |
| Ingredient | Control | Depolymerized Tamarind Gum[a] |
| Flour | 120 | 120 |
| Salt | 1.5 | 1.5 |
| Sucrose | 24 | — |
| Bulking Agent | — | 24 |
| Egg | 25 | 25 |
| Milk | 122.5 | 122.5 |
| Shortening | 16 | 16 |
| Baking Powder | 6 | 6 |
| Sunette ®[b] | — | 3.8 |

[a]Tamarind gum was depolymerized by the method of Example 1 to an estimated peak molecular weight of 1,073–6,221.
[b]Sunette ® is the trademark for acesulfame-K, a high intensity sweetener obtained from Hoechst-Celanese, Somerville, New Jersey. Sunette (3.8 g) contains 0.12 g of acesulfame-K with the balance being dextrose.

The muffins were baked at 400° F. (205° C.) for 17 minutes and visually evaluated for crumb and crust color, crumbliness of the muffin, moist/dry appearance, volume and overall textural qualities. In all aspects, the depolymerized tamarind gum sample closely resembled the sucrose control. The only discernible difference was a slightly more moist appearance in the tamarind sample. Prior to baking, the batter viscosity and pouring characteristics were essentially the same.

Thus, the bulking agents herein may functionally replace 100% of the sugar in conventional baked goods.

EXAMPLE 12

This example illustrates the use of the bulking agents in edible formulations.

A. Cakes

Yellow cakes were prepared according to the following formulation, employing the controls and bulking agents listed in Table III, below.

| | Yellow Cake Formulation | |
|---|---|---|
| | Weight % | |
| Ingredient | Control | Test |
| Water | 29.2 | 29.2 |
| Flour | 24.8 | 24.8 |
| Sugar | 29.2 | 14.6[a] |
| Bulking Agent | 0.0 | 14.6 |
| Shortening | 9.3 | 9.3 |

-continued

Yellow Cake Formulation

| Ingredient | Weight % Control | Weight % Test |
|---|---|---|
| Nonfat Dry Milk | 3.0 | 3.0 |
| Dry Egg | 2.5 | 2.5 |
| Baking Powder | 1.0 | 1.0 |
| Salt | 0.5 | 0.5 |
| Vanilla Extract | 0.5 | 0.5 |

[a]At 50% sucrose replacement, the cake contained 14.6%, each, bulking agent and sucrose; at 40% replacement, the cake contained 11.7% bulking agent, 17.5% sucrose. One sample contained no bulking agent and 14.6% sucrose (50% of the usual sucrose content).

Cakes were prepared by blending dry ingredients; mixing dry ingredients, shortening, water and vanilla on low setting in a Mix Master® mixer for one minute; blending in the mixer (setting 8) for two minutes; pouring batter into greased and floured pan; and baking at 177° C. (350° F.) for 30 minutes.

Bulking agents were used at 50% and 40% sucrose replacement level. Cakes were evaluated against the sucrose control for center rise, edge rise, crust and crumb color, crumb structure, crumb feel and overall organoleptic impression.

Results are shown in Table III. The bulking agents having a DE of at least 20 and a molecular weight distribution wherein at least 90% of the depolymerized gum had a molecular weight of less than 10,000 provided cake volume, crumb texture, mouthfeel and cake appearance equivalent to that of the sucrose (100%) control. The 50% sucrose sample that contained no bulking agent was unacceptable.

TABLE III

Bulking Agents Used to Replace Sucrose in Yellow Cakes

| Bulking Agents | Estimated Peak Mol. weight | % Mol. Weight over 10,000 | D.E. | Viscosity 30% Soln cps | % Sucrose Replacement | Quality Evaluation Cakes |
|---|---|---|---|---|---|---|
| Tamarind[a] | 650–2,500 | 2.2 | 24 | — | 50 | Acceptable |
| Tamarind[b] | 1,100–2,700 | 0 | 23 | 240[f] | 50 | Acceptable |
| Guar[c] | 1,200–2,700 | 15.9 | 10.5 | 2,500 | 40 | Unacceptable |
| Guar[d] | 250–11,000 | 9.4 | 20 | 50 | 40 | Marginally Acceptable |
| Locust Bean[e] | 280–2,300 | 0 | 35 | 20 | 50 | Acceptable |
| Sucrose (29.2%) | 342 | — | 0 | — | 0 | Acceptable |
| Sucrose[g] (14.6%) | 342 | — | 0 | — | 0 | Unacceptable |

[a]The sample was depolymerized by the method of Example 1 except that 5 ml of Celluclast enzyme was used to treat 500 g of refined tamarind gum.
[b]The sample was prepared by the method of Example 2 from crude tamarind kernel powder. The estimated peak molecular weight range represents 93.3% of the total product.
[c]The sample was prepared by the method of Example 3, except that 50 ml of Gamanase (un-filtered) was used to treat the guar gum for a 2 hour period. The estimated peak molecular weight range represents 76% of the total product.
[d]The sample was prepared by the method of Example 3, except that 40 ml of Gamanase (un-filtered) was used to treat the guar gum initially; another 14 ml Gamanase was added after 24 hours; another 10 ml after 48 hours; and the depolymerization was terminated after 72 hours.

TABLE III-continued

Bulking Agents Used to Replace Sucrose in Yellow Cakes

| Bulking Agents | Estimated Peak Mol. weight | % Mol. Weight over 10,000 | D.E. | Viscosity 30% Soln cps | % Sucrose Replacement | Quality Evaluation Cakes |
|---|---|---|---|---|---|---|

[e]The sample was prepared by the method of Example 6.
[f]Viscosity was measured in a 50% solution.
[g]This sample contained 50% of the sucrose normally used in a cake (14.9% of the total cake formulation).

B. Cooked Puddings

Puddings were prepared according to the following formulation, employing the controls and bulking agents listed in Table IV, below.

Cooked Pudding Formulation

| Ingredient | Control | Test (50%) | Test (100%) |
|---|---|---|---|
| Starch[a] | 4.0 | 4.0 | 4.0 |
| Sugar | 14.0 | 7.0 | — |
| Bulking Agent | — | 7.0 | 14.0 |
| Vanilla | 0.75 | 0.75 | 0.75 |
| Salt | 0.25 | 0.25 | 0.25 |
| Skim Milk | 81.0 | 81.0 | 81.0 |

The ingredients were dry blended, added to lukewarm milk, slowly heated to 185° F. (88° C.) and held at 185° F. for 10 minutes.

Bulking agents were used at 50 and 100% sucrose replacement levels. Puddings were evaluated against the sucrose control and a polydextrose-containing sample for viscosity, body, mouthfeel and overall texture. Results are shown in Table IV, below.

TABLE IV

Bulking Agents Used to Replace Sucrose in Cooked Puddings

| Bulking Agents | Estimated Peak Mol. weight | % Mol. Weight over 10,000 | D.E. | Viscosity 30% Soln cps | % Sucrose Replacement | Quality Evaluation Puddings |
|---|---|---|---|---|---|---|
| Guar[a] | 730–5,700 | 15.9 | 10.5 | 2,500 | 100 | Unacceptable |
| Guar[b] | 425–14,800 | 36.7 | 12.5 | 700 | 100 | Unacceptable |
| Guar[c] | 250–11,000 | 9.4 | 20 | 50 | 50 | Marginally Acceptable |
| Guar[c] | 250–11,000 | 9.4 | 20 | 50 | 50 | Acceptable |
| Tamarind[d] | 1,100–2,700 | 0 | 23 | 240[g] | 100 | Acceptable |
| Tamarind[e] | 1,100–6,200 | 2.3 | 24 | — | 100 | Acceptable |
| Sucrose | 342 | — | 0 | — | 0 | Acceptable |
| Polydextrose[f] | — | — | — | — | 100 | Acceptable |

[a]The sample was depolymerized by the method of Example 3, except that 50 mls of Gamanase enzyme was used to treat the guar gum for a total of 2 hours.

TABLE IV-continued

Bulking Agents Used to Replace Sucrose in Cooked Puddings

| Bulking Agents | Estimated Peak Mol. weight | % Mol. Weight over 10,000 | D.E. | Viscosity 30% Soln cps | % Sucrose Replacement | Quality Evaluation Puddings |
|---|---|---|---|---|---|---|

[b]The sample was depolymerized by the method of Example 3, except that 12 L of water and 75 mls of Gamanase enzyme were used to treat 3 Kg of guar gum for a 4 hours period. The estimated peak molecular weight range represents 86% of the total product.
[c]The sample was prepared by the method of Example 3, except that 40 ml of Gamanase (un-filtered), was used to treat the guar gum initially; another 14 ml Gamanase was added after 24 hours; another 10 ml after 48 hours; and the depolymerization was terminated after 72 hours.
[d]The sample was prepared by the method of Example 2 from crude tamarind kernel powder.
[e]The sample was prepared by the method of Example 1. The estimated peak molecular weight represents 85% of the total product; 8.5% of the total product had a molecular weight less than 300.
[f]Pfizer, Inc., New York, New York.
[g]Viscosity was measured in a 50% solution.

The bulking agents having a DE of at least 20 and an estimated molecular weight distribution wherein at least 90% of the depolymerized gum had a molecular weight of less than 10,000 provided cooked pudding viscosity, body, mouthfeel and overall texture equivalent to that of the sucrose control and polydextrose-containing sample.

The Kcal content of the cooked pudding dry mix was calculated based on zero Kcal/g for the bulking agents and 4.0 Kcal/g for sucrose. At 50% sucrose replacement the dry mix had 230 Xcal/100 g dry mix compared to 378 Kcal/100 g for the sucrose control. At 100% sucrose replacement, the dry mix had 84 Kcal/100 g dry mix.

Now that the preferred embodiments of the present invention have been described in detail, various modifications and improvements thereon will become readily apparent to those skilled in the art. Accordingly, the scope and spirit of the invention are to be limited only by the claims and not by the foregoing specification.

We claim:

1. Soluble bulking agents for use in edible formulations, comprising substantially depolymerized heteropolysaccharide(s) having an average DP of 3 to 75, which heteropolysaccharide(s) are naturally occurring and have hexose backbone(s).

2. The bulking agents of claim 1, comprising at least 90%, by weight, of depolymerized heteropolysaccharide(s) having a weight average molecular weight of less than 10,000.

3. The bulking agents of claim 2, comprising depolymerized heteropolysaccharide(s) having a weight average molecular weight from about 500 to 10,000.

4. The bulking agents of claim 1, comprising substantially non-digestible depolymerized heteropolysaccharide(s) having a DP of at least 3.

5. The bulking agents of claim 1, comprising depolymerized heteropolysaccharide(s) having an average DP of 3 to 30.

6. The bulking agents of claim 1, comprising depolymerized heteropolysaccharide(s) having a dextrose equivalent of at least 20.

7. The bulking agents of claim 1, wherein the depolymerized heteropolysaccharide(s) are derived from pectin, carrageenan, tamarind seed gum, xanthan gum, agar, alginate(s), guar gum, locust bean (carob seed) gum, konjac gum, or a combination thereof, by enzymatic, chemical, thermal or mechanical depolymerization process(es), or by a combination thereof.

8. The bulking agents of claim 7, wherein the depolymerized heteropolysaccharide(s) are derived from tamarind seed gum which has been depolymerized to a weight average molecular weight of 500 to 10,000.

9. The bulking agents of claim 7, wherein the depolymerized heteropolysaccharide(s) are derived from guar gum which as been depolymerized to a weight average molecular weight of 500 to 10,000.

10. The bulking agents of claim 7, wherein the depolymerized heteropolysaccharide(s) are derived from locust bean gum which has been depolymerized to a weight average molecular weight of 500 to 10,000.

11. The bulking agents of claim 1, comprising at least one enzymatically depolymerized, naturally-occurring, heteropolysaccharide.

* * * * *